United States Patent
Gore et al.

(10) Patent No.: US 6,712,991 B2
(45) Date of Patent: Mar. 30, 2004

(54) METHOD OF MAKING A COPOLYMER USEFUL AS VISCOSITY INDEX IMPROVING ADDITIVE FOR HYDRAULIC FLUID

(75) Inventors: Robert H. Gore, Southampton, PA (US); Bridget M. Stevens, Horsham, PA (US)

(73) Assignee: Rohmax Additives GmbH, Darmstadt (DE)

( * ) Notice: Subject to any disclaimer, the term of this patent is extended or adjusted under 35 U.S.C. 154(b) by 0 days.

(21) Appl. No.: 09/988,133

(22) Filed: Nov. 19, 2001

(65) Prior Publication Data

US 2002/0123583 A1 Sep. 5, 2002

Related U.S. Application Data

(60) Continuation of application No. 08/304,057, filed on Sep. 12, 1994, now abandoned, which is a division of application No. 08/097,496, filed on Jul. 23, 1993, now abandoned.

(51) Int. Cl.$^7$ .................. C09K 5/00; C10M 145/14; C08F 2/00
(52) U.S. Cl. ............... 252/79; 508/469; 526/78; 526/328; 526/329.5
(58) Field of Search .......... 508/469; 252/73.79; 44/397; 526/78, 328, 329.5

(56) References Cited

U.S. PATENT DOCUMENTS

| | | |
|---|---|---|
| 3,166,508 A | 1/1965 | Fields |
| 3,249,545 A | 5/1966 | Van Der Voort et al. |
| 3,546,097 A | 12/1970 | Tupper |
| 3,621,004 A | 11/1971 | Eckert |
| 3,642,633 A | 2/1972 | Eckert et al. |
| 4,330,420 A | 5/1982 | White et al. |
| 4,968,444 A | 11/1990 | Knoell et al. |
| 5,112,509 A | 5/1992 | Bring, Jr. et al. |
| 5,312,884 A | 5/1994 | Gore et al. |
| 5,368,761 A | 11/1994 | Gore et al. |
| 5,416,162 A | 5/1995 | Gore et al. |
| 5,817,606 A | 10/1998 | Kinker et al. |
| 5,863,999 A | 1/1999 | Kinker et al. |
| 6,140,431 A | 10/2000 | Kinker et al. |

FOREIGN PATENT DOCUMENTS

| | | | |
|---|---|---|---|
| CA | 734918 | | 5/1966 |
| EP | 153209 | * | 8/1985 |
| FR | 1534501 | | 8/1967 |
| FR | 2346380 | | 10/1977 |
| FR | 153209 | | 1/1985 |
| GB | 172697 | | 10/1966 |

OTHER PUBLICATIONS

*Acryloid1019 Composition*, 1p. Table No date.
Plastic Additives, An Industrial Guide, Noyes Publications, Copyright 1986*Initiators* DUPONT: Vazo Polymerization Initiators: Cover page, Catalog Page, p. 261.

* cited by examiner

*Primary Examiner*—Cephia D. Toomer
(74) *Attorney, Agent, or Firm*—Oblon, Spivak, McClelland, Maier & Neustadt, P.C.

(57) ABSTRACT

A method for making a viscosity index improving copolymer includes heating a reaction mixture including from about 55 weight percent to about 99.5 weight percent of a first monomer selected from the group consisting of ($C_8$–$C_{15}$)alkyl (meth)acrylates and mixtures thereof, from about 0.5 weight percent to about 45 weight percent of a second monomer selected from the group consisting of ($C_1$–$C_7$)alkyl (meth)acrylates, ($C_{16}$–$C_{24}$)alkyl(meth)acrylates and mixtures thereof, a polymerization initiator and a hydrocarbon diluent, to a reaction temperature from about 75° C. to about 100° C. and maintaining the reaction mixture at the reaction temperature for a period of time effective to allow copolymerization of the monomers.

18 Claims, No Drawings

METHOD OF MAKING A COPOLYMER USEFUL AS VISCOSITY INDEX IMPROVING ADDITIVE FOR HYDRAULIC FLUID

This application is a continuation of application Ser. No. 08/304,057 filed on Sep. 12, 1994 now abandoned which is a Division of Ser. No. 08/097,496 filed on Jul. 23, 1993 now abandoned.

TECHNICAL FIELD

The present invention relates to certain poly(alkyl (meth) acrylates) useful as viscosity index improving additives for hydraulic fluids.

BACKGROUND

Hydraulic systems, e.g., systems wherein the operation of high speed, high pressure hydraulic pumps is subject to wide temperature variations, can impose severe demands on hydraulic fluids.

Additives for improving the properties, e.g., the viscosity index, of hydrocarbon base oils used in hydraulic fluids are known. Viscosity index improving additives reduce the influence of temperature changes on fluid viscosity. British Patent GB 1,172,697 discloses viscosity index improving copolymers of up to 50 weight % "readily polymerizable" monoethylenically unsaturated monomers, e.g., styrene, t-butyl methacrylate, methyl methacrylate and mixtures thereof, with at least 50 weight % "difficulty polymerizable" monoethylenically unsaturated monomers, e.g., lauryl methacrylate. U.S. Pat. No. 5,112,509 discloses a method for making a poly(methyl methacrylate-co-lauryl methacrylate) copolymer for use in hydraulic fluids and lubricating oil compositions as a viscosity index improver. The process includes heating a reaction mixture of the monomers and a polymerization initiator to a temperature from 200° F. to 300° F.

Paraffinic oils have a tendency to gel at low temperatures due to ordering of wax molecules in the oil. In some hydraulic systems, e.g., mobile equipment, startup temperatures may be well below 0° F. and it is critically important that the hydraulic fluid in the system remains fluid at the low temperatures encountered. High performance hydraulic fluid compositions for applications involving low startup temperatures typically include a pour point depressing additive, in addition to a viscosity index improving additive, to improve the low temperature fluidity of the hydraulic fluid.

Along with their several advantageous effects, known poly(alkyl (meth)acrylate) viscosity index improvers can impart at least one undesirable property to the hydraulic fluids in which they are used. Hydraulic fluids formulated with such additives have shown a tendency to form emulsions with ambient moisture during use. The performance of the emulsified fluids is compromised with respect to, e.g., lubricity, corrosion resistance, low temperature performance and compressibility. In addition, the presence of small amounts water in hydraulic fluids has been found to detrimentally effect the filterability of such fluids. Reduced filterability may result in plugging of hydraulic system filters.

SUMMARY OF THE INVENTION

A method for making a copolymer for improving the viscosity index of a hydraulic fluid is disclosed. The method includes the steps of:

heating a reaction mixture to a reaction temperature from about 75° C. to about 100° C., said reaction mixture comprising:

from about 55 weight percent to about 99.5 weight percent of a first monomer selected from the group consisting of ($C_8$–$C_5$)alkyl (meth)acrylates and mixtures thereof;

from about 0.5 weight percent to about 45 weight percent of a second monomer selected from the group consisting of ($C_1$–$C_7$)alkyl (meth)acrylates, ($C_{16}$–$C_{24}$)alkyl (meth)acrylates and mixtures thereof;

an effective amount of a polymerization initiator; and a hydrocarbon diluent; and maintaining the reaction mixture at the reaction temperature for a period of time effective to allow copolymerization the monomers. Copolymers made by the process of the present invention provide viscosity index improvement to the hydraulic fluids in which they are used while providing improved demulsibility and filterability relative to viscosity index improving additives made by known processes.

DETAILED DESCRIPTION OF THE INVENTION

The copolymer of the present invention includes from about 55 weight percent (wt %) to about 99.5 wt % repeating units, each having the structural formula (1):

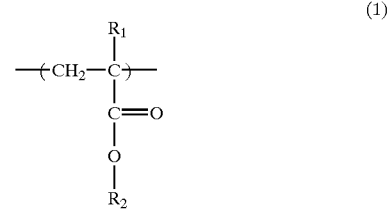

wherein each occurrence of $R_1$ is H or methyl and each occurrence of $R_2$ is independently selected from the group consisting of ($C_8$–$C_{15}$)alkyl and from 0.5 wt % to about 45 wt % repeating units selected from the group consisting of repeating units of the structural formulae (2), (3) or (4) disclosed below, and mixtures thereof. As used herein, the term "copolymer" means a polymer having more than one type of repeating unit and includes, e.g., copolymers, terpolymers and tetrapolymers.

Preferably, $R_1$ is methyl.

As used herein, ($C_8$–$C_{15}$) alkyl means any straight or branched alkyl group having 8 to 15 carbon atoms per group, e.g., octyl, nonyl, decyl, isodecyl, undecyl, lauryl, tridecyl, myristyl, pentadecyl. Preferably, $R_2$ is($C_{10}$–$C_{15}$)alkyl. More preferably, $R_2$ is selected from the group consisting of isodecyl, lauryl, tridecyl, myristyl, pentadecyl and mixtures thereof.

The copolymer of the present invention includes from about 0 wt % to about 45 wt % repeating units, each having the structural formula (2):

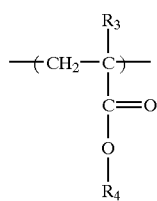

(2)

wherein each occurrence of $R_3$ is independently H or methyl and each occurrence of $R_4$ is independently n-butyl, isobutyl or t-butyl.

The copolymer includes from about 0 wt % to about 20 wt % repeating units, each having the structural formula (3):

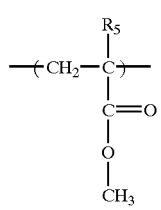

(3)

wherein each occurrence of $R_5$ is independently H or methyl. Preferably, $R_5$ is methyl.

The copolymer includes from about 0 wt % to about 35 wt % repeating units, each having the structural formula (4):

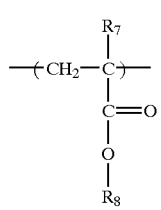

(4)

wherein each occurrence of $R_7$ is independently H or methyl and each occurrence of $R_8$ is independently selected from the group consisting of ($C_{16}$–$C_{24}$) alkyl. Preferably, $R_7$ is methyl.

As used herein, ($C_{16}$–$C_{24}$) alkyl means any straight or branched alkyl group having 16 to 24 carbon atoms per group, e.g., stearyl, heptadecyl, cetyl, nonadecyl, eicosyl. Preferably, and $R_8$ is ($C_{16}$–$C_{20}$)alkyl. More preferably, $R_8$ is selected from the group consisting of stearyl, cetyl, eicosyl and mixtures thereof.

The copolymer of the present invention has a number average molecular weight, determined, e.g., by gel permeation chromatography, between about 15,000 and about 120,000, preferably between about 20,000 and about 100,000, and most preferably between about 25,000 and about 75,000.

The copolymer of the present invention has a weight average molecular weight, determined, e.g., by gel permeation chromatography, between about 25,000 and about 225,000, preferably between about 37,500 and about 225,000, and most preferably between about 50,000 and about 200,000.

In a preferred embodiment, the copolymer includes from about 55 wt % to about 99.5 wt % repeating units of the structural formula (1) and from about 0.5 wt % to about 45 wt % repeating units of the structural formula (2). More preferably, the copolymer includes from about 60 wt % to about 90 wt % repeating units of the structural formula (1) and from about 10 wt % to about 40 wt % repeating units of the structural formula (2). Even more preferably, the copolymer includes from about 70 wt % to about 85 wt % repeating units of the structural formula (1) and from about 15 wt % to about 30 wt % repeating units of the structural formula (2).

In a second preferred embodiment, the copolymer includes from about 55 wt % to about 98.5 wt % repeating units of the structural formula (1) from about 0.5 wt % to about 44 wt % repeating units of the structural formula (2) and from about 1 wt % to about 20 wt % repeating units of the structural formula (3). More preferably, the copolymer includes from about 60 wt % to about 87.5 wt % repeating units of the structural formula (1) from about 10 wt % to about 37.5 wt % repeating units of the structural formula (2) and from about 2.5 wt % to about 17 wt % repeating units of the structural formula (3). Still more preferably, the copolymer includes from about 70 wt %, to about 80 wt % repeating units of the structural formula (1) from about 15 wt % to about 25 wt % repeating units of the structural formula (2) and from about 5 wt % to about 15 wt % repeating units of the structural formula (3)

In a third preferred embodiment, the copolymer includes from about 55 wt % to about 97 wt % repeating units of the structural formula (1) and from about 0.5 wt % to about 42.5 wt % repeating units of the structural formula (2) and from about 2.5 wt % to about 35 wt % repeating units of the structural formula (4). More preferably, the copolymer includes from about 60 wt % to about 85 wt % repeating units of the structural formula (1) and from about 10 wt % to about 35 wt % repeating units of the structural formula (2) and from about 5 wt % to about 25 wt % repeating units of the structural formula (4). Still more preferably, the copolymer includes from about 65 wt % to about 75 wt % repeating units of the structural formula (1) and from about 15 wt % to about 25 wt % repeating units of the structural formula (2) and from about 10 wt % to about 20 wt % repeating units of the structural formula (4).

In a fourth preferred embodiment, the copolymer includes from about 55 wt % to about 96 wt % repeating units of the structural formula (1), from about 0.5 wt % to about 41.5 wt % repeating units of the structural formula (2), from about 1 to about 20 wt % repeating units of the structural formula (3), and from about 2.5 wt % to about 35 wt % repeating units of the structural formula (4). More preferably, the copolymer includes from about 55 wt % to about 82.5 wt % repeating units of the structural formula (1), from about 10 wt % to about 37.5 wt % repeating units of the structural formula (2), from about 2.5 wt % to about 17 wt % repeating units of the structural formula (3), and from about 5 wt % to about 25 wt % repeating units of the structural formula (4). Still more preferably, the copolymer includes from about 55 wt % to about 70 wt % repeating units of the structural formula (1), from about 15 wt % to about 30 wt % repeating units of the structural formula (2), from about 5 wt % to about 15 wt % repeating units of the structural formula (3), and from about 10 wt % to about 20 wt % repeating units of the structural formula (4).

In a fifth preferred embodiment, the copolymer includes from greater than about 90 wt % to about 99.5 wt % repeating units of the structural formula (1) and from about 0.5 wt % to less than about 10 wt % repeating units of the structural formula (3). More preferably, the copolymer includes from about 92 wt % to about 97.5 wt % repeating units of the structural formula (1) and from about 2.5 wt % to about 8 wt % repeating units of the structural formula (3).

In a sixth preferred embodiment, the copolymer includes from about 55 wt % to about 96.5 wt % repeating units of the structural formula (1), from about 1 wt % to about 20 wt % repeating units of the structural formula (3) and from about 2.5 wt % to about 35 wt % repeating units of the structural formula (4). More preferably, the copolymer includes from about 60 wt % to about 92.5 wt % repeating units of the structural formula (1), from about 2.5 wt % to about 17 wt % repeating units of the structural formula (3) and from about 5 wt % to about 25 wt % repeating units of the structural formula (4). Still more preferably, the copolymer includes from about 70 wt % to about 85 wt % repeating units of the structural formula (1), from about 5 wt % to about 15 wt % repeating units of the structural formula (3) and from about 10 wt % to about 20 wt % repeating units of the structural formula (4).

The copolymer of the present invention can be made by free radical initiated polymerization of alkyl (meth)acrylate monomers, wherein the term "alkyl (meth)acrylate" is used to refer to alkyl acrylate monomers, alkyl methacrylate monomers and mixtures thereof. Similarly, the terminology "(meth)acrylic acid is used herein to refer to acrylic acid, methacrylic acid and mixtures thereof. Commercially available alkyl (meth)acrylate monomers may be, and typically are, mixtures of esters. Such mixtures are typically referred to, and are referred to herein, using a contracted version of the names of the ester species predominating in the mixture, e.g., "lauryl-myristyl methacrylate", "cetyl-eicosyl methacrylate", "cetyl-stearyl methacrylate", "dodecyl-pentadecyl methacrylate".

In the process of the present invention, a reaction mixture of a diluent, appropriate relative amounts of appropriate respective alkyl (meth)acrylate monomers and an effective amount of a polymerization initiator is charged to a reaction vessel. preferably, the reaction vessel is equipped with a stirrer, a thermometer, a reflux condenser and a metering line.

The usefulness of the method of the present invention is not limited to the above described preferred copolymer compositions, i.e., the method provides improved demulsibility properties to known copolymers, e.g. poly(lauryl methacrylate/methyl methacrylate) copolymers, as well.

In a preferred embodiment, the reaction mixture includes from about 55 weight percent to about 99.5 weight percent of a first monomer selected from the group consisting of $(C_8–C_{15})$alkyl (meth)acrylates and mixtures thereof and from about 0.5 weight percent to about 45 weight percent of a second monomer selected from the group consisting of $(C_1–C_7)$alkyl (meth)acrylates, $(C_{16}–C_{24})$alkyl (meth) acrylates and mixtures thereof.

As used herein the terminology "$(C_1–C_7)$alkyl (meth) acrylates" means an alkyl ester of (meth)acrylic acid having a straight or branched alkyl group of 1 to 7 carbon atoms per group and includes, e.g., methyl methacrylate, ethyl acrylate, propyl methacrylate, butyl acrylate, pentyl methacrylate, hexyl acrylate and heptyl methacrylate.

In a more highly preferred embodiment of the process, the monomers of the reaction mixture are selected so that the process provides a copolymer according to one of the above described preferred embodiments of the copolymer of the present invention.

In a preferred embodiment, those repeating units of the copolymer having structural formula (1) are derived from a $(C_8–C_{15})$alkyl (meth)acrylate monomer, more preferably, a $(C_8–C_{15})$alkyl methacrylate monomer.

As used herein, "$(C_8–C_{15})$alkyl (meth)acrylate monomer" means an alkyl ester of (meth)acrylic acid having a straight or branched alkyl group of 8 to 15 carbon atoms per group, including, e.g., octyl methacrylate, nonyl methacrylate, decyl methacrylate, isodecyl methacrylate, undecyl methacrylate, lauryl methacrylate, lauryl acrylate, tridecyl methacrylate, myristyl methacrylate, pentadecyl methacrylate and mixtures thereof, e.g., lauryl-myristyl methacrylate, dodecyl-pentadecyl methacrylate.

In a preferred embodiment, those repeating units of the copolymer having structural formula (2) are derived from a $(C_4)$alkyl (meth)acrylate monomer, more preferably, a $(C_4)$ alkyl methacrylate monomer.

As used herein, "$(C_4)$alkyl (meth)acrylate monomer" is used synonymously with the terminology "butyl (meth) acrylate" and means an alkyl ester of (meth)acrylic acid having a straight or branched alkyl group of 4 carbon atoms per group and includes, e.g., n-butyl acrylate, n-butyl methacrylate, iso-butyl methacrylate, t-butyl methacrylate.

In a preferred embodiment, those repeating units of the copolymer having structural formula (3) are derived from methyl (meth)acrylate monomer, more preferably, methyl methacrylate monomer.

In a preferred embodiment, those repeating units of the copolymer having structural formula (4) are derived from a $(C_{16}–C_{24})$alkyl (meth)acrylate monomer, more preferably, a $(C_{16}–C_{24})$alkyl methacrylate monomer.

As used herein, "$(C_{16}–C_{24})$alkyl (meth)acrylate monomer" means an alkyl ester of (meth)acrylic acid having a straight or branched alkyl group of 16 to 24 carbon atoms per group, including, e.g., stearyl acrylate, stearyl methacrylate, cetyl methacrylate, heptadecyl methacrylate, nonadecyl methacrylate, eicosyl methacrylate and mixtures thereof, e.g., cetyl-stearyl methacrylate, cetyl-eicosyl methacrylate.

The diluent may be an inert hydrocarbon and is preferably a hydrocarbon lubricating oil which is compatible with or identical to the base oil in which the additive is to be subsequently employed. The mixture includes, e.g., from about 15 to about 400 parts by weight (pbw) diluent per pbw total monomers and, more preferably, from about 50 to about 200 pbw diluent per 100 pbw total monomers. As used herein, "total monomers" means the combined amount of all monomers in the reaction mixture.

Suitable polymerization initiators include those initiators which dissociate upon relatively mild heating, i.e., at temperatures up to about 100° C., to yield a free radical.

In a preferred embodiment, the polymerization initiator is an initiator having a half-life of less than about 30 minutes at the intended reaction temperature. Those polymerization initiators having a half-life from about 1 minute to about 180 minutes at about 100° C., e.g., 2,2'-azobis (2-methylbutanenitrile), 2,2' azobis (2,4-dimethylpentanenitrile),1,1'-azobis (cyclohexanecarbonitrile), t-butyl peroctoate and mixtures thereof, are particularly preferred. More preferred are those polymerization initiators having a half life of about 5 minutes to about 30 minutes at about 90° C., including, e.g., 2,2'-azobis (2-methylbutanenitrile), 2,2' azobis (2,4-dimethylpentanenitrile).

The reaction mixture includes, e.g., from about 0.05 pbw to about 2.0 pbw polymerization initiator per 100 pbw total monomers and, more preferably, from about 0.1 pbw to about 1.0 pbw polymerization initiator per 100 pbw total monomers.

In a preferred embodiment, the reaction mixture includes a chain transfer agent. Suitable chain transfer agents include those conventional in the art, e.g., dodecyl mercaptan, ethyl mercaptan. Dodecyl mercaptan is preferred as the chain transfer agent. The selection of the amount of chain transfer agent to be used is based on the desired molecular weight of the polymer being synthesized in a manner conventional in the art. The reaction mixture typically includes, e.g., from about 0.05 pbw to about 1.9 pbw chain transfer agent per 100 pbw total monomers, and more preferably includes from about 0.1 pbw to about 0.8 pbw chain transfer agent per 100 pbw total monomers.

The reaction mixture is charged to the reaction vessel and heated with stirring, preferably under an inert, e.g., nitrogen, blanket to a temperature within a first reaction temperature range. Selection of limits of the first reaction temperature range is based on the initiator selected and the range includes those temperatures effective to rapidly dissociate the selected initiator to an upper limit of about 100° C., e.g., from about 75° C. to about 100° C. In a preferred embodiment, the first reaction temperature range is from about 75° C. to about 95° C. The batch is then maintained at a temperature within the first reaction temperature range, with stirring, for a time period effective to allow copolymerization of the monomers in the reaction mixture, e.g., for about 2 hours to about 12 hours.

In a preferred embodiment, a portion, e.g., from about 25% to about 60%, of the reaction mixture is initially charged to the reaction vessel and heated to a temperature within the first reaction temperature range. The remaining portion of the reaction mixture is then fed into the reaction vessel with stirring and while maintaining the batch at a temperature within the first reaction temperature range over a time period of about 30 minutes to about 180 minutes. Following completion of the reaction mixture addition, the batch is maintained at a temperature within the first reaction temperature range for a holding period of up to about 4 hours.

In a preferred embodiment, an second portion of initiator of about 0.05 pbw to about 1.0 pbw polymerization initiator per 100 pbw total monomers is added to the reaction mixture subsequent to the holding period.

In one preferred embodiment, the second portion of initiator is added to the reaction mixture at a substantially continuous rate over a time period of about 30 minutes to about 180 minutes while maintaining the reaction mixture at a temperature within a second reaction temperature range, wherein the second reaction temperature range includes those temperatures, up to about 100° C., e.g., from about 75° C. to about 100° C. and preferably from about 75° C. to about 95° C., effective to rapidly dissociate the added initiator.

In an alternate preferred embodiment, the second portion of polymerization initiator is added by periodically charging subportions of the second portion of initiator to the reaction vessel while maintaining the reaction mixture at a temperature within a second reaction temperature range, wherein the second reaction temperature range includes those temperatures, up to about 100° C., e.g., from about 75° C. to about 100° C. and preferably from about 75° C. to about 95° C., effective to rapidly dissociate the added initiator.

In a preferred embodiment, the second portion of initiator is the same initiator as that in the initial reaction mixture and the first and second reaction temperature ranges are identical. Alternatively, the composition of the second portion of initiator may differ from the initiator present in the initial reaction mixture and, in the embodiment wherein subportions of initiator are periodically charged to the reaction vessel, the compositions of the respective subportions may differ from each other. Selection of the appropriate second reaction temperature range to be maintained following each addition of initiator is based on the respective half-life of each of the added portions of initiator in the manner described above.

The reaction mixture is held at the second reaction temperature range for a time period of about 30 minutes to about 180 minutes subsequent to the addition of the second portion of polymerization initiator to complete the polymerization reaction.

A viscous solution of the copolymer of the present invention in the diluent is obtained as the product of the reaction.

The above-discussed copolymers are each combined with a base oil, e.g., a paraffinic solvent neutral oil, in a conventional manner, i.e., by adding the copolymer to the base oil to form a solution of the additive in the base oil, to provide a hydraulic fluid composition having the desired viscometric properties.

In a preferred embodiment, a hydraulic fluid of the present invention includes from about 2 pbw to about 20 pbw viscosity index improving copolymer per 100 pbw base oil.

In a preferred embodiment, the copolymer is added to the base oil in the form of a relatively concentrated solution of the copolymer in a diluent, e.g., a solution of from about 100 pbw copolymer dissolved in from about 25 pbw to about 250 pbw of the hydrocarbon diluent used in the above described polymerization process.

The hydraulic fluid may include other conventional additives, e.g., antioxidants, anti-wear additives, in addition to the viscosity index improving copolymer of the present invention.

EXAMPLE 1

A reaction mixture was prepared by combining 1046.15 grams (85 pbw) lauryl-myristyl methacrylate (100% basis, 97.5% purity), 180 grams (15 pbw) butyl methacrylate, 1.32 grams (0.11 pbw) of a polymerization initiator (2,2'-azobis (2-methylbutanenitrile), 9 grams (0.75 pbw) of a chain transfer agent (dodecyl mercaptan) and 1.92 grams (0.16 pbw) paraffinic oil (100N oil).

A 2 liter reactor equipped with a thermometer, a temperature controller, a stirrer, an addition funnel, a purge gas inlet and a water-cooled reflux condenser with a purge gas outlet was charged with 13.8 grams (1.15 pbw) paraffinic oil and then flushed with nitrogen.

A portion (~30 wt %) of the reaction mixture was then charged to the nitrogen-flushed reactor and heated. When the temperature reached 95° C. the remainder of the reaction mixture was added to the reactor at a steady rate over a time period of 60 minutes. The temperature of the batch was maintained at 95° C. during the addition. After all the reaction mixture was charged, the batch was held at 95° C., with stirring, for 30 minutes.

After the 30 minute holding period, a first shot of an initiator mixture (1.32 grams (0.11 pbw) 2,2'-azobis (2-methylbutanenitrile)) and 60 grams (5 pbw) paraffinic oil) was added to the reactor and the temperature was held at 95° C. for an additional 30 minutes. Two additional shots of initiator were then added to the batch, with a 30 minute hold at 95° C. between shots.

Thirty minutes after the addition of the final initiator shot, 163.85 grams (13.65 pbw) paraffinic oil were charged to the reactor to dilute the product mixture.

The above described process yielded 1595.5 grams of a polymer solution having a crude polymer solids content of 72.86 weight percent at a monomer conversion of 96.87%, a kinematic viscosity (measured according to ASTM D445) of 763 centiStokes (cSt) at 100° C. and shear stability index (SSI) (measured according to ASTM D-2603) of 6.5.

EXAMPLE 2

The procedure set forth above in Example 1 was followed, except that 2,2' azobis (2,4-dimethylpentanenitrile) was used as the polymerization initiator, the reaction was run at 80° C. rather than 95° C. and 100.48 grams (15.46 pbw) oil was added to yield a product mixture having a crude polymer solids content of 73.43% at a monomer conversion of 99.0%, a kinematic viscosity of 703 cSt at 100° C. and SSI of 5.9.

EXAMPLE 3

The procedure set forth above in Example 1 was followed, except that 1,1'-azobis(cyclohexanecarbonitrile) was used as the initiator, the reaction was run at 120° C. rather than 95° C. and 100.48 grams (15.46 pbw) oil was added to yield a product mixture having a crude polymer solids content of 70.6% at a monomer conversion of 95.1%, a kinematic viscosity of 569 cSt at 100° C. and SSI of 5.5.

EXAMPLE 4

The procedure set forth above in Example 1 was followed, except that t-butyl peroctoate was used as the initiator, the reaction was run at 120° C. rather than 95° C., additional initiator was continuously fed to the reactor rather than being added in discrete shots (after the first 30 minute holding period at the reaction temperature a stream of 1.70 grams (0.17 pbw) t-butyl peroctoate in 150 grams (15.0 pbw) oil was added at a steady rate over 60 minutes and then held at the reaction temperature for 30 minutes) and 135.19 grams (13.5 pbw) oil was added to yield a product mixture having a crude polymer solids content of 72.78% at a monomer conversion of 98.95%, a kinematic viscosity of 749 cSt at 100° C. and SSI of 8.5.

EXAMPLES 5 TO 16

The copolymers of Examples 5 to 16 and C1 were each made according to the process set forth above in Example 1, except that different initiators and reaction temperatures, were used.

The relative monomer composition of the reaction mixture, the polymerization process used to make each of the copolymers of Examples 1 to 15 and C1 and the polymer solids of the respective reaction products are summarized below in Table 1:

the monomers used are abbreviated in Table 1 as:

methyl methacrylate (MMA);

butyl methacrylate (BMA);

lauryl-myristyl methacrylate (LMMA); and stearyl methacrylate (SMA);

and the Example numbers specified in the "Process" column of Table 1 denote which of the above described processes was used in the preparation of each of the respective copolymers, i.e.

Example 1 (2,2'-azobis (2-methylbutanenitrile), 95° C.);

Example 2 (2,2' azobis (2,4-dimethylpentanenitrile), 80° C.);

Example 3 (1,1'-azobis(cyclohexanecarbonitrile), 120° C.); or

Example 4 (t-butyl peroctoate, 120° C.).

TABLE 1

| Copolymer (Example No.) | Process (Example No.) (%) | Polymer Solids | LMMA/BMA/ MMA/SMA (wt %) |
|---|---|---|---|
| 1 | 1 | 72.86 | 85/15/0/0 |
| 2 | 2 | 73.43 | 85/15/0/0 |
| 3 | 3 | 70.6 | 85/15/0/0 |
| 4 | 4 | 72.78 | 85/15/0/0 |
| 5 | 3 | 72.20 | 80/20/0/0 |
| 6 | 3 | 71.25 | 75/25/0/0 |
| 7 | 3 | 72.72 | 70/30/0/0 |
| 8 | 4 | 69.47 | 65/35/0/0 |
| 9 | 3 | 73.01 | 65/35/0/0 |
| 10 | 1 | 73.66 | 75/25/0/0 |
| 11 | 1 | 70.18 | 70/15/0/15 |
| 12 | 1 | 75.25 | 60/15/10/15 |
| 13 | 1 | 74.96 | 75/0/10/15 |
| 14 | 1 | 74.21 | 70/0/15/15 |
| 15 | 3 | 73.32 | 94.8/0/5.2/0 |
| 16 | 3 | 74.13 | 100/0/0/0 |

EXAMPLES 17, 18 AND C1

Copolymers of a known composition (85 wt % LMA/15 wt % MMA) were made by the respective processes of Example 3, 1 and 2, as summarized below in Table 2.

TABLE 2

| Composition (Example No.) | Process (Example No.) | LMMA/MMA (wt %) |
|---|---|---|
| C1 | 3 | 85/15 |
| 17 | 1 | 85/15 |
| 18 | 2 | 85/15 |

EXAMPLES 19–21

Copolymers of the composition 70 wt % LMMA/15 wt % MMA/15 wt % SMA were made by the process of Example 4 except that different respective amounts of the chain transfer agent (dodecyl mercaptan) were used. The amount of chain transfer agent (CTA) used, expressed as parts by weight chain transfer agent per 100 parts by weight of the combined amount of LMMA, MMA and SMA monomers (pbw CTA/100 pbw monomers), the number average molecular weight ($MW_n$) and the weight average molecular weight ($MW_w$) for each of Examples 19–21 are set forth below in Table 3. The molecular weights were measured by gel permeation chromatography using a poly(methyl methacrylate) standard.

TABLE 3

| Example No. | CTA (pbw CTA/100 pbw monomers) | $MW_n$ | $MW_w$ |
|---|---|---|---|
| 19 | 0.25 | $1.8 \times 10^5$ | $6.64 \times 10^4$ |
| 20 | 0.475 | $9.7 \times 10^4$ | $4.35 \times 10^4$ |
| 21 | 0.75 | $5.1 \times 10^4$ | $2.22 \times 10^4$ |

EXAMPLE 22

Hydraulic fluid formulations including each of the respective compositions of Examples 1 to 18 and C1 were characterized with respect to the viscosity index, demulsibility, low temperature kinematic viscosity and filterability.

Samples for use in measuring viscosity index were formulated by adding an amount (~10 wt %) of a respective one of the compositions of Examples 1 to 18 and C1 to hydraulic oil (Sun HPO 100) effective to provide a kinematic viscosity of 10.75 cSt at 100° C. The viscosity index of each of the samples was determined according to ASTM method D 2270-74 by comparing the respective kinematic viscosities at 40° C. and 100° C. Results are set forth below in Table 4 as VI.

Samples for use in measuring demulsibility were formulated by adding 10 pbw of a respective one of the compositions of Examples 1 to 18 and C1 to 90 pbw base oil (Sun HPO 100). The demulsibility of each of the samples was characterized by the method of ASTM D 1401; A 40 milliliter (ml) volume of the sample material was emulsified with a 40 mL volume of distilled water by stirring the combined liquids in a graduated cylinder. The separation of the emulsion into organic and aqueous layers was characterized by monitoring the relative volumes of the respective oil, water and emulsion layers after cessation of stirring. Results are set forth below in Table 4 as the respective (ml oil/ml water/ml emulsion) observed at 10 minutes and 30 minutes after cessation of stirring.

Low temperature kinematic viscosity is a measurement of the ability of the hydraulic fluid to flow at low temperature. Samples for use in measuring low temperature kinematic viscosity were formulated by adding an amount (~7 wt %) of a respective one of the viscosity index improvers of Examples 1 to 18 and C1 to a base oil blend (blend of 65 wt % Shell HVI 60 and 35 wt % Shell MVIN 40) effective to provide a kinematic viscosity of 32 (plus or minus 10%) millimeters$^2$/second at 40° C. The kinematic viscosity of each of the samples was measured, using the method of ASTM D 445, at −30° C. (the HVI 60/MVIN 40 base oil blend was solid at −30° C.). Results are set forth below in Table 4 as KV@−30° C. (cSt).

Samples for use in measuring filterability were formulated by adding an amount (~7 wt %) of a respective one of the viscosity index improvers of Examples 1 to 18 and C1 corresponding to the amount used in the samples prepared for low temperature kinematic viscosity testing to a base oil (Shell HVI 60). The filterability of each of the hydraulic fluid compositions was characterized according to Centre European de Transmission Oleo Pneumatique (CETOP) test method GB 15.01 D. The time required for a one liter volume of each of the respective samples to filter through a membrane having a porosity of 1.2 micron under a vacuum of 65 centimeters (26 inches) of mercury was measured (the various lots of HVI 60 base oil used exhibited filtration times from about 20 to about 25 minutes). Results are set forth below in Table 4 as filtration time (minutes).

TABLE 4

| Composition (Example No.) | VI | KV@ −30° C. (cSt) | Filtration Time (minutes) | Demulsibility (ml oil/ml water/ml emulsion) 10 min | 30 min |
|---|---|---|---|---|---|
| 1 | 152 | 6420 | — | 10/26/44 | 31/38/1 |
| 2 | 153 | — | 47.5 | 11/29/40 | 40/39/1 |
| 3 | 152 | — | 57.5 | 10/24/46 | 39/36/5 |
| 4 | 153 | — | — | 3/26/51 | 41/34/5 |
| 5 | 150 | — | — | 42/36/2 | 41/38/1 |
| 6 | 153 | — | 49 | 8/20/52 | 35/36/9 |
| 7 | 156 | — | 39 | 5/15/60 | 20/33/27 |
| 8 | 154 | — | 45.5 | 5/10/65 | 15/27/38 |
| 9 | 153 | — | 43 | 40/39/1 | 40/39/1 |
| 10 | 157 | 7000 | 130 | 7/9/64 | 13/17/50 |
| 11 | 154 | — | 150 | 13/15/52 | 40/36/4 |

TABLE 4-continued

| Composition (Example No.) | VI | KV@ −30° C. (cSt) | Filtration Time (minutes) | Demulsibility (ml oil/ml water/ml emulsion) 10 min | 30 min |
|---|---|---|---|---|---|
| 12 | 160 | 4976 | 75 | 6/23/51 | 15/35/30 |
| 13 | 157 | 4200 | 105 | 10/10/60 | 15/20/45 |
| 14 | 161 | 3935 | 97 | 4/4/72 | 8/10/62 |
| 15 | 152 | — | — | 10/14/56 | 40/37/3 |
| 16 | 152 | — | 86.5 | 39/40/1 | 39/40/1 |
| 17 | 156 | — | — | 22/25/33 | 35/36/9 |
| 18 | 157 | — | — | 18/17/45 | 37/36/7 |
| C1 | 157 | — | — | 4/2/74 | 20/14/46 |
| HPO 100 | 90 | — | — | 40/40/0 | — |

The process of the present invention provides copolymers useful as viscosity index improving additives for hydraulic fluids. Copolymers made by the process provide improved demulsibility and filterability to such fluids, relative to viscosity index improving additives made by known processes.

We claim:

1. A method of making a viscosity index improving additive for a hydraulic fluid, comprising:
   heating a reaction mixture to a reaction temperature from about 75° C. to about 95° C., said reaction mixture comprising:
      from about 55 weight percent to about 99.5 weight percent of a first monomer selected form the group consisting of ($C_8$–$C_{15}$)alkyl (meth)acrylates and mixtures thereof;
      from about 0.5 weight percent to about 45 weight percent of a second monomer selected from the group consisting of ($C_1$–$C_7$)alkyl (meth)acrylates, ($C_{16}$–$C_{24}$)alkyl (meth)acrylates and mixtures thereof;
      an effective amount of a polymerization initiator selected from the group consisting of 2,2'-azobis (2-methylbutanenitrile), 2,2'-azobis (2,4-dimethylpentanenitrile), and mixtures thereof; and
      a hydrocarbon diluent; and
   maintaining the reaction mixture at the reaction temperature of about 75° C. to about 95° C., for a period of time effective to allow copolymerization of the monomers.

2. The method of claim 1, wherein the effective amount of initiator is from about 0.05 parts by weight to about 2.0 parts by weight per 100 parts by weight monomers.

3. The method of claim 1, wherein the first monomer comprises lauryl methacrylate.

4. The method of claim 1, wherein the second monomer comprises butyl methacrylate.

5. The method of claim 1, wherein the second monomer comprises methyl methacrylate.

6. The method of claim 1, wherein the second monomer comprises a mixture of butyl methacrylate and methyl methacrylate.

7. The method of claim 1, wherein the second monomer comprises a mixture of butyl methacrylate and a ($C_{16}$–$C_{24}$) alkyl(meth)acrylate.

8. The method of claim 1, wherein the second monomer comprises a mixture of methyl methacrylate and a ($C_{16}$–$C_{24}$) alkyl(meth)acrylate.

9. The method of claim 1, wherein the second monomer comprises a mixture of butyl methacrylate, methyl methacrylate and a ($C_{16}$–$C_{24}$)alkyl(meth)acrylate.

10. The method of claim 1, wherein the reaction mixture is divided into two or more portions and wherein the reaction mixture is heated by charging one portion of the reaction mixture to a reaction vessel; heating the one portion of the reaction mixture and then feeding the remaining one or more portions of the reaction mixture to the reaction vessel reaction mixture at a controlled rate while maintaining the heating.

11. The method of claim 1, further comprising adding a second amount of polymerization initiator to the reaction mixture during the step of maintaining the reaction mixture at the reaction temperature.

12. The method of claim 11, wherein the second amount of initiator is fed into the reaction mixture at a substantially continuous rate.

13. The method of claim 11, wherein the second amount of initiator is introduced into the reaction mixture as a series of discrete subportions.

14. The method of claim 11, wherein the second amount of initiator comprises from about 0.1 part by weight to about 1.0 part by weight of the initiator per 100 parts by weight monomer.

15. The method of claim 11, wherein the reaction mixture is maintained at the reaction temperature for a time period of about 30 minutes to about 4 hours prior to the addition of the second amount of initiator and then maintained at a temperature from about 75° C. to about 100° C. for a period of about 30 minutes to about 4 hours subsequent to the addition of the second amount of initiator.

16. A copolymer made by the method of claim 1.

17. A viscosity index improving additive composition for hydraulic fluids, comprising about 100 parts by weight of a copolymer made by the method of claim 1 and from about 25 to about 250 parts by weight of a hydrocarbon diluent.

18. A hydraulic fluid composition, comprising a hydraulic fluid base oil and from about 2 weight percent to about 20 weight percent of a copolymer made by the method of claim 1.

* * * * *